United States Patent
Sumi et al.

(10) Patent No.: US 8,926,784 B2
(45) Date of Patent: Jan. 6, 2015

(54) RESIN LAMINATE MANUFACTURING METHOD

(75) Inventors: Takehiko Sumi, Kanagawa (JP); Yoshitaka Matsubara, Kanagawa (JP)

(73) Assignee: Kyoraku Co., Ltd., Kyoto (JP)

( * ) Notice: Subject to any disclaimer, the term of this patent is extended or adjusted under 35 U.S.C. 154(b) by 172 days.

(21) Appl. No.: 13/132,024

(22) PCT Filed: Feb. 9, 2011

(86) PCT No.: PCT/JP2011/050018
§ 371 (c)(1),
(2), (4) Date: May 31, 2011

(87) PCT Pub. No.: WO2011/081224
PCT Pub. Date: Jul. 7, 2011

(65) Prior Publication Data
US 2011/0303355 A1 Dec. 15, 2011

(30) Foreign Application Priority Data

Dec. 29, 2009 (JP) .................. 2009-299038
Dec. 29, 2009 (JP) .................. 2009-299074

(51) Int. Cl.
*B29C 65/00* (2006.01)
*B32B 37/00* (2006.01)
(Continued)

(52) U.S. Cl.
CPC ........... *B60R 13/013* (2013.01); *B29C 47/0019* (2013.01); *B29C 47/54* (2013.01);
(Continued)

(58) Field of Classification Search
USPC .......... 156/285, 286, 382; 264/511, 526, 553, 264/571; 425/504, 546, 388, 405.1, 405.2
See application file for complete search history.

(56) References Cited

U.S. PATENT DOCUMENTS

| 4,423,000 A | 12/1983 | Teraoka |
| 4,592,718 A | 6/1986 | Teraoka |

(Continued)

FOREIGN PATENT DOCUMENTS

| DE | 3406399 | 8/1985 |
| DE | 10 2007 030 369 | 1/2009 |

(Continued)

*Primary Examiner* — Richard Crispino
*Assistant Examiner* — Matthew Hoover
(74) *Attorney, Agent, or Firm* — Troutman Sanders LLP

(57) ABSTRACT

A resin laminate manufacturing method includes providing a pair of split mold blocks one of which has a cavity provided with a plurality of protrusions extending toward the other mold block, preparing two molten thermoplastic resin sheets each having an adjusted thickness, feeding the two molten thermoplastic resin sheets between the pair of split mold blocks with a predetermined gap left therebetween, forming a hermetic space between one of the sheets and the cavity of the one mold block opposed to an outer surface of the one sheet, sucking air in the hermetic space from the side of the one mold block, pressing the outer surface of the one sheet against the cavity of the one mold block to shape the one sheet, forming cup-shaped portions, and clamping the pair of mold blocks.

10 Claims, 6 Drawing Sheets

(51) Int. Cl.
| | | |
|---|---|---|
| *B29C 45/00* | (2006.01) | |
| *B29C 47/00* | (2006.01) | |
| *B29C 39/02* | (2006.01) | |
| *B29C 43/02* | (2006.01) | |
| *B29C 49/00* | (2006.01) | |
| *B29C 49/08* | (2006.01) | |
| *B29C 67/00* | (2006.01) | |
| *B29D 22/00* | (2006.01) | |
| *B29C 51/00* | (2006.01) | |
| *B29D 24/00* | (2006.01) | |
| *B29D 29/00* | (2006.01) | |
| *B29C 43/10* | (2006.01) | |
| *B60R 13/01* | (2006.01) | |
| *B29C 47/54* | (2006.01) | |
| *B29C 51/26* | (2006.01) | |
| *B32B 3/28* | (2006.01) | |
| *B32B 27/08* | (2006.01) | |
| *B32B 27/12* | (2006.01) | |
| *B32B 27/32* | (2006.01) | |
| *B29C 47/36* | (2006.01) | |
| *B29C 51/10* | (2006.01) | |
| *B29C 49/48* | (2006.01) | |
| *B29C 51/02* | (2006.01) | |
| *B29C 51/36* | (2006.01) | |
| *B29C 49/02* | (2006.01) | |
| *B29C 49/04* | (2006.01) | |
| *B29C 49/20* | (2006.01) | |

(52) U.S. Cl.
CPC ............... *B29C 51/267* (2013.01); *B32B 3/28* (2013.01); *B32B 27/08* (2013.01); *B32B 27/12* (2013.01); *B32B 27/32* (2013.01); *B29C 47/366* (2013.01); *B29C 51/10* (2013.01); *B29C 2791/006* (2013.01); *B29C 2947/9258* (2013.01); *B29C 2947/926* (2013.01); *B32B 2250/03* (2013.01); *B32B 2262/0253* (2013.01); *B32B 2262/0276* (2013.01); *B29C 49/4802* (2013.01); *B29C 51/02* (2013.01); *B29C 51/36* (2013.01); *B29C 2049/0057* (2013.01); *B29C 2049/023* (2013.01); *B29C 49/041* (2013.01); *B29C 2049/047* (2013.01); *B29C 2049/048* (2013.01); *B29C 2049/2017* (2013.01); *B29C 2049/203* (2013.01); *B29C 2049/4807* (2013.01); *B29C 2049/4812* (2013.01)
USPC ........... 156/285; 156/286; 156/382; 264/511; 264/526; 264/553; 264/571; 425/504; 425/546; 425/388; 425/405.1; 425/405.2

(56) References Cited

U.S. PATENT DOCUMENTS

| | | | |
|---|---|---|---|
| 5,460,772 A | * | 10/1995 | Ohta ........................... 264/515 |
| 5,507,999 A | | 4/1996 | Copsey et al. |
| 5,658,523 A | | 8/1997 | Shuert |
| 5,843,366 A | | 12/1998 | Shuert |
| 5,851,560 A | * | 12/1998 | Kobayashi et al. ........... 425/121 |
| 2003/0003266 A1 | | 1/2003 | Van Manen |
| 2004/0062908 A1 | | 4/2004 | Van Manen |
| 2008/0254261 A1 | | 10/2008 | Tamada |

FOREIGN PATENT DOCUMENTS

| | | |
|---|---|---|
| GB | 2085797 | 5/1982 |
| JP | 07156255 A | 6/1995 |
| JP | 07171877 A | 7/1995 |
| JP | 11105113 A | 4/1999 |
| JP | 11254509 A | 9/1999 |
| JP | 2000085039 A | 3/2000 |
| JP | 2003071912 A | 3/2003 |
| JP | 2003071913 A | 3/2003 |
| JP | 2006103027 A | 4/2006 |
| JP | 2008213342 A | 9/2008 |
| WO | 02/098637 | 12/2002 |

* cited by examiner

RESIN LAMINATE MANUFACTURING METHOD

RELATED APPLICATIONS

The present application is a National Phase of International Application Number PCT/JP2011/050018, filed Feb. 9, 2011, which claims priority from, Japanese Application Number 2009-299038, filed Dec. 29, 2009, and Japanese Application Number 2009-299074, filed Dec. 29, 2009.

TECHNICAL FIELD

The present invention relates to resin laminate manufacturing methods. More specifically, the invention relates to a resin laminate manufacturing method capable of achieving satisfactory reduction in weight and wall thickness while ensuring manufacture efficiency and product quality.

BACKGROUND ART

Heretofore, so-called resin laminates have been adopted as interior components for automobiles, components for building, and packaging components for physical distribution. A resin laminate includes a front-side member made of resin and a back-side member made of resin. The back-side member is provided with a cup-shaped portion the bottom of which butts against an inner surface of the front-side member. In cases of interior components for automobiles and components for building, to which outward appearances are of importance, particularly, a nonwoven fabric is laminated on a front side of the front-side member. Heretofore, various methods have been adopted as a method for manufacturing such a resin laminate. First, there has been adopted a technique of manufacturing a resin laminate from a molten resin through integral extrusion blow molding. The resin laminate manufactured by this method has a cup-shaped portion for connecting between a front-side member and a back-side member. As compared with a resin laminate having a double-wall hollow structure that a hollow portion is formed merely therein, therefore, this resin laminate can ensure stiffness, particularly, compressive stiffness relative to a load to be applied to a surface member in a vertical direction.

Second, there has been adopted a technique disclosed in Patent Document 1. According to this technique, two molten sheets, which are extruded independently of each other, are caused to pass between a pair of rolls one of which is a roll having a large number of protrusions arranged in a staggered pattern on a surface thereof, with a predetermined pressing force applied to each sheet. Thus, a plurality of cup-shaped portions are formed on one of the sheets. Moreover, the two sheets are welded to each other in a state that the bottom of each cup-shaped portion butts against an inner surface of the other sheet. Further, a different sheet is welded to a surface of the one sheet where an opening of each cup-shaped portion is formed. Herein, the resultant resin laminate has a three-layer structure that the different sheets are welded to the front and back of the sheet having the cup-shaped portion formed thereon, respectively.

Third, there has been adopted a technique disclosed in Patent Document 2, which is different from the second method. According to this technique, two molten sheets, which are extruded independently of each other, are caused to pass between a pair of rolls each of which is a roll having a large number of protrusions arranged in a staggered pattern on a surface thereof, with a predetermined pressing force applied to each sheet. Thus, a plurality of cup-shaped portions are formed on each of the sheets. Moreover, the two sheets are welded to each other in a state that the bottoms of the corresponding cup-shaped portions on the respective sheets are welded to each other. Further, a different sheet is welded to a side of each sheet opposed to the welded side. Herein, the resultant resin laminate has a four-layer structure that the different sheets are welded to the sides of the respective sheets where an opening of each cup-shaped portion is formed. The foregoing techniques of manufacturing a resin laminate by extrusion of a molten sheet each have the following technical problems.

That is, it is difficult to obtain a resin laminate having satisfactory strength with no anisotropy while ensuring manufacture efficiency. More specifically, the first to third methods have a problem unique to extrusion molding, in common. That is, in the extrusion molding, the sheet has an open end in a direction of extrusion, which indispensably requires facing treatment such as heat sealing treatment. As the result, an extra step is required for manufacturing the resin laminate, which leads to reduction in total manufacture efficiency. Further, the welding of the sheet on which the cup-shaped portions are arranged in a staggered pattern to the other sheet or the welding of the sheet on which the cup-shaped portions are arranged in a staggered pattern to the sheet on which the cup-shaped portions are also arranged in a staggered pattern is merely effected by the pressing force to be applied at the time when both the sheets pass between the pair of rollers while being fed by the rollers. As the result, a time required for the welding is insufficient, which makes it difficult to obtain the resin laminate having satisfactory strength and degrades the quality of the resin laminate. However, blow molding rather than the continuous extrusion molding allows prevention of the reduction in manufacture efficiency due to the facing treatment and the reduction in strength due to the insufficient welding. Patent Document 3 discloses a method using the blow molding. According to the technique disclosed in Patent Document 3, a tubular molten parison is used. A back wall has a cup-shaped portion the bottom of which butts against and is welded to an inner surface of a front wall, and a mounting material is laminated on an outer surface of the front wall. However, the blow molding for molding a tubular parison by application of a blowing pressure causes the following technical problem which is different from the foregoing problem. That is, it is difficult to satisfactorily reduce the weight and wall thickness of a resin laminate since the resin laminate is manufactured by molding a tubular parison having a uniform wall thickness in a circumferential direction by application of a blowing pressure.

More specifically, a tubular parison has a substantially uniform thickness in a circumferential direction because it is normally extruded from an annular slit between die cores. In blow molding, on the other hand, in a case of clamping a pair of split mold blocks, a blowing pressure is applied from a hermetic space formed between the mold blocks. Therefore, a force to be applied to press the parison against the mold block is uniform throughout the parison. However, the parison to be pressed against one of the mold blocks having the cup-shaped portion formed thereon is elongated because of a relation with a blow ratio according to a depth of a cup-shaped portion and a diameter of an opening to have a locally thin wall portion. On the other hand, the parison to be pressed against the other mold block having no cup-shaped portion formed thereon has no thin wall portion. In view of this point, the thickness of the tubular parison must be set based on the thin wall portion on the one mold block side, so that the sheet on the other mold block side has an unnecessary thickness. As described above, in the case of using a tubular parison having a substantially uniform wall thickness in a circumferential direction, a wall surface on which a plurality of cup-shaped portions are formed after blow molding and a wall surface on which no cup-shaped portions are formed are irreversibly difficult in thickness from each other. Because of this reason, it is impossible to achieve satisfactory reduction in weight and wall thickness of a resin laminate. With regard to this point, Patent Document 4 discloses a method for manufacturing a thermoplastic resin plate. Herein, the plate is manufactured from two molten sheets based on a tubular parison. The plate has a hollow portion formed therein, and two opposed sides each provided with a plurality of cup-shaped portions. The respective cup-shaped portions are formed such that the bottoms thereof are arranged back to back. However, in cases of resin laminates used as interior components for automobiles and components for building, to which outward appearances of front surfaces are of importance, a decorative material such as a nonwoven fabric needs to be laminated on the one sheet serving as the front surface. For this reason, it is preferable to prevent openings of a large number of cup-shaped portions from being formed on a surface of the one sheet.

Patent Document 1: Japanese Patent No. 4327275
Patent Document 2: Japanese Patent No. 4192138
Patent Document 3: JP 11-105113 A
Patent Document 4: JP 07-171877 A

DISCLOSURE OF THE INVENTION

Problems to be Solved by the Invention

In view of the technical problems described above, it is an object of the present invention to provide a resin laminate manufacturing method capable of achieving satisfactory reduction in weight and wall thickness while ensuring manufacture efficiency and product quality.

Solutions to the Problems

In order to accomplish the object described above, a resin laminate manufacturing method according to the present invention includes: a step of providing a pair of split mold blocks one of which has a cavity provided with a plurality of protrusions each extending toward the other one, and preparing two molten thermoplastic resin sheets each having a thickness adjusted; a step of feeding the two molten thermoplastic resin sheets between the pair of split mold blocks with a predetermined gap left therebetween such that each thermoplastic resin sheet protrudes around annular pinch-off parts; a step of forming a hermetic space between one of the sheets and the cavity of the one mold block opposed to an outer surface of the one sheet; a step of sucking air in the hermetic space from the one mold block side, pressing the outer surface of the one sheet against the cavity of the one mold block and shaping the sheet to form cup-shaped portions; and a step of clamping the pair of mold blocks, welding peripheral edges of the two molten thermoplastic resin sheets to each other, and welding the bottoms of the cup-shaped portions formed on the one sheet to an inner surface of the other sheet. The resin laminate thus manufactured by this method has a feature that the two sheets are substantially equal in thickness to each other.

The resin laminate manufacturing method having the configuration described above has the following advantages. For example, two thermoplastic resin sheets each having a thickness adjusted are fed between the split mold blocks, a hermetic space is formed between one of the resin sheets and the cavity of the mold block opposed to the resin sheet, and air in the hermetic space is sucked from the mold block side. In this case, according to conventional blow molding, a tubular parison is shaped along the cavity by a blowing pressure to be applied thereto. Herein, since the plurality of protrusions are provided on the cavity of only one of the mold blocks, the parison is elongated largely only at the protrusion-provided cavity. However, the parison is not elongated so much at the cavity having no protrusions provided thereon. This is problematic because there occurs a difference in wall thickness. On the other hand, the method according to the present invention can solve the problem. Therefore, it is possible to reduce the thicknesses of the two resin sheets independently of each other as much as possible while ensuring the required strength. As the result, it is possible to achieve satisfactory reduction in weight and wall thickness while ensuring manufacture efficiency and product quality. Preferably, the two molten thermoplastic resin sheets are shaped in such a manner that after the clamping step, a blowing pressure is applied to the two sheets from the hermetic space formed between the pair of mold blocks clamped to press the two sheets against the cavities of the corresponding mold blocks, respectively. Also preferably, the resin laminate manufacturing method includes a step of extruding two streaks of sheet-like molten parisons toward a position between the pair of split mold blocks such that the parisons droop downward. Also preferably, the protrusions are provided in plural rows on the surface of the cavity with a predetermined gap left therebetween in a vertical direction, and at least part of the protrusions on each row is arranged on the surface of the cavity in a strip shape to extend in a horizontal direction. Also preferably, the protrusions are arranged in a staggered pattern on the cavity. Also preferably, the protrusion is tapered toward the other mold block to have a regular hexagonal prismoid shape. Also preferably, the other sheet has an outer surface to which a decorative material is laminated. Also preferably, the sucking step includes a step of shifting an outer frame outwardly fit to a peripheral edge of the one mold block in a slidable manner in a direction of clamping, toward the outer surface of the one sheet, and a hermetic space is formed by the outer surface of the one sheet, an inner circumferential surface of the outer frame, and the cavity of the one mold block. Also preferably, the pinch-off parts are brought into contact with each other through the clamping of the pair of mold blocks, so that a parting line is formed by welding the peripheral edges of the two molten thermoplastic resin sheets to each other and a hermetic hollow portion is formed between the two molten thermoplastic resin sheets.

BEST MODE FOR CARRYING OUT THE INVENTION

A method for manufacturing a resin laminate 100 according to an embodiment of the present invention will be described below in detail with reference to the drawings. As illustrated in FIGS. 1 to 3, the resin laminate 100 includes a front-side sheet 120A, a back-side sheet 120B, and a decorative material sheet 140 laminated on an outer surface 150 of the front-side sheet 120A. The resin laminate 100 has a laminated structure of three layers, that is, the decorative material sheet 140, the front-side sheet 120A and the back-side sheet 120B. In order to show an inner structure of the resin laminate 100 explicitly, FIG. 1 does not illustrate a circumferential end of the resin laminate 100.

A thickness (a wall thickness) of each of the front-side sheet 120A and the back-side sheet 120B and a total thickness (a board thickness) as the vehicle interior product 100 may be set appropriately in accordance with the usage of the vehicle interior product 100. In terms of weight reduction, the wall thickness is not more than 1.5 mm, preferably not more than 1.0 mm, and the board thickness is not more than 15 mm, preferably not more than 10 mm. The back-side sheet 120B has a large number of cup-shaped portions 200 the bottoms of which are bonded to an inner surface 170 opposed to the outer surface 150, to which the decorative material sheet 140 is bonded, in the front-side sheet 120A. A depth of each of the large number of cup-shaped portions 200 substantially defines the thickness of the laminated structure board 100. Each of the large number of cup-shaped portions 200 is tapered inwardly so as to extend to the inner surface side, and is formed by ribs 122 each extending between an inner surface 180 of the back-side sheet 120B and the inner surface 170 of the front-side sheet 120A. The most tapered bottom of each of the plurality of cup-shaped portions 200 is formed by a butt plane 240 bonded to the inner surface 170 of the front-side sheet 120A. The number of cup-shaped portions 200 may be set appropriately in accordance with the usage of the resin laminate 100. The larger number allows achievement of higher stiffness relative to the weight.

As illustrated in FIG. 1, preferably, each of the plurality of cup-shaped portions 200 has an opening 260 formed in a regular hexagonal prismoid shape at an outer surface 220 of the back-side sheet 120B. Also preferably, these openings 260 are arranged in a honeycomb pattern on the outer surface 220. In other words, the openings 260 are arranged on the outer surface 220 such that opposed sides of the adjacent openings 260 become parallel. Thus, it is possible to most densely arrange the plurality of cup-shaped portions 200 on the outer surface 220. Moreover, it is also possible to arrange the plurality of cup-shaped portions 200 on the outer surface 200 such that corners of the adjacent regular hexagonal prismoid-shaped openings 260 come close to each other. The uniform arrangement such that corners of the openings 260 come close to each other facilitates cutting operations to be performed upon preparation of a mold for such a sheet. With regard to the size of the opening 260 of each of the plurality of cup-shaped portion 200, the depth of the cup-shaped portion 200 and the gap between the adjacent cup-shaped portions 200, the smaller size of the opening 260, the deeper depth of the cup-shaped portion 200 and the smaller gap between the adjacent cup-shaped portions 200 allow achievement of higher stiffness relative to the weight of the entire laminate 100. As illustrated in FIG. 3, a hermetic hollow portion 280 is formed between the front-side sheet 120A and the back-side sheet 120B. This hermetic hollow portion 280 is enclosed with an outer peripheral wall of the back-side sheet 120B at a circumferential end surface of the laminated structure board 100. As a modification, preferably, the plurality of cup-shaped portions 200 are distributed and arranged uniformly on the outer surface 220. However, the shape of the cup-shaped portion 200 may be selected appropriately from various shapes such as a cone shape, a truncated cone shape, a cylinder shape, a prism shape, a pyramid shape and a hemisphere shape.

It is assumed herein that the back-side sheet 120B is molded by clamping two split mold blocks 32 with two molten thermoplastic resin sheets P fed therebetween, as will be described later. In such a case, the laminate 100 to be obtained herein can provide the following advantages. That is, the hermetic hollow portion 280 is formed at a desired position between the front-side sheet 120A and the back-side sheet 120B, and a desired surface profile is provided in accordance with the usage of the laminate 100. On the other hand, the front-side sheet 120A and the back-side sheet 120B are welded for desirably realizing a contour or surface profile and an inner structure according to the usage of the laminate 100. Particularly, a circumferential edge surface of the front-side sheet 120A and a circumferential edge surface of the back-side sheet 120B are welded to each other, so that a parting line PL is formed. The following description is given of a molding apparatus for such a laminate 100.

As illustrated in FIG. 4, the molding apparatus 10 for a laminate 100 includes an extruding machine 12, and a clamping machine 14 disposed below the extruding machine 12. The extruding machine 12 feeds molten thermoplastic resin sheets P extruded therefrom to the clamping machine 14, and then the clamping machine 14 molds the molten thermoplastic resin sheets P. Herein, mechanisms for extruding thermoplastic resins and feeding the resins to the clamping machine 14 are similar to each other; therefore, only one of them will be described. With regard to the other one of the mechanisms, similar or corresponding constituent elements are denoted with similar reference symbols, and the description thereof will not be given here.

The extruding machine 12 is of a conventionally known type; therefore, the detailed description thereof will not be given here. The extruding machine 12 includes a cylinder 18 provided with a hopper 16, a screw (not illustrated) provided inside the cylinder 18, a hydraulic motor 20 coupled to the screw, an accumulator 22 the inside of which communicates with the cylinder 18, and a plunger 24 provided inside the accumulator 22. Herein, a resin pellet is charged into the cylinder 18 through the hopper 16, and then is molten and kneaded by the rotation of the screw through the hydraulic motor 20. Next, the molten resin is transferred to and retained by a certain amount in the accumulator chamber 22. Next, the molten resin is fed to a T-die 28 by the driving of the plunger 24, and then a continuous thermoplastic resin sheet P having a predetermined length is extruded through an extrusion slit 34. The thermoplastic resin sheet P is fed downward while being held and pressed by a pair of rollers 30 disposed with a gap left therebetween to droop between split mold blocks 32. Thus, the thermoplastic resin sheet P having an even thickness in a vertical direction (a direction of extrusion) is fed between the split mold blocks 32, as will be described later in detail.

The extrusion performance of the extruding machine 12 is selected appropriately in terms of the size of a resin molded product to be molded and the prevention of draw-down or neck-in of the thermoplastic resin sheet P. From the practical viewpoints, more specifically, an extrusion amount per one shot in intermittent extrusion is preferably 1 to 10 kg, and an extrusion rate of resin from the extrusion slit 34 is not less than several hundreds kg/hr, more preferably not less than 700 kg/hr. In terms of the prevention of draw-down or neck-in of the thermoplastic resin sheet P, preferably, a step of extruding the thermoplastic resin sheet P is carried out in a shorter time as much as possible. Although depending on a type, an MFR value and a melt tension value of a resin, typically, the extruding step is completed preferably within 40 seconds, more preferably within a range from 10 to 20 seconds. For this reason, an extrusion amount of a thermoplastic resin from the extrusion slit 34 per unit time and unit area is not less than 50 kg/hr/cm$^2$, more preferably not less than 150 kg/hr/cm$^2$.

The thermoplastic resin sheet P held between the pair of rollers 30 is fed downward by the rotations of the pair of rollers 30. Thus, the thermoplastic resin sheet P can be extended and thinned. The adjustment of a relation between an extrusion rate of the thermoplastic resin sheet P and a feeding rate of the thermoplastic resin sheet P by the pair of rollers 30 allows the prevention of draw-down or neck-in.

Therefore, it is possible to minimize the restraint to a type, an MFR value, a melt tension value or an extrusion amount per unit time with regard to a resin.

As illustrated in FIG. 4, the extrusion slit 34 provided on the T-die 28 is directed downward in a vertical direction. The thermoplastic resin sheet P extruded from the extrusion slit 34 is fed downward in the vertical direction so as to droop from the extrusion slit 34 as it is. The extrusion slit 34 having a variable width allows change of the thickness of the thermoplastic resin sheet P.

Herein, the pair of rollers 30 are described. The pair of rollers 30 are disposed almost horizontally below the extrusion slit 34 such that the respective axes of rotation become parallel. One of the pair of rollers 30 corresponds to the rotating drive roller 30A and the other one is the rotated drive roller 30B. More specifically, as illustrated in FIG. 3, the pair of rollers 30 are disposed diametrically with respect to the thermoplastic resin sheet P to be extruded from the extrusion slit 34 so as to droop downward.

A diameter and an axial length of each roller may be set appropriately in accordance with the extrusion rate of the thermoplastic resin sheet P to be molded, the length and width of the sheet in the direction of extrusion, the type of the resin, and the like. As will be described later, preferably, the diameter of the rotating drive roller 30A is slightly larger than the diameter of the rotated drive roller 30B from the viewpoint that the thermoplastic resin sheet P is fed downward smoothly by the rotations of the pair of rollers 30 in the state that the thermoplastic resin sheet P is held between the rollers 30. Preferably, the diameter of the roller falls within a range from 50 to 300 mm. Upon contact with the thermoplastic resin sheet P, the larger curvature or the smaller curvature of the roller causes such a malfunction that the thermoplastic resin sheet P is wound around the roller. On the other hand, the clamping machine 14 is also of a conventionally known type as in the extruding machine 12; therefore, the detailed description thereof will not be given here. The clamping machine 14 includes the two split mold blocks 32A and 32B, and a mold drive device that causes the mold blocks 32A and 32B to move between an open position and a close position in a direction which is substantially orthogonal to the feeding direction of the thermoplastic resin sheet P.

As illustrated in FIG. 4, the two split mold blocks 32A and 32B are arranged such that cavities 116 thereof are opposed to each other along the substantially vertical direction. Each cavity 116 has a surface provided with protrusions 119 to be formed in accordance with a contour and a surface profile of a molded product to be molded from the molten thermoplastic resin sheet P. More specifically, the surface of the cavity 116A of the mold block 32A for molding the back-side sheet 120B is provided with the protrusions 119. Herein, the protrusions 119 are formed to extend toward the cavity 116B of the mold block 32B and are complementary to the cup-shaped portions 200. Thus, the cup-shaped portions 200 are formed on the outer surface of the back-side sheet 120B. The plurality of protrusions 119 may be arranged on the surface of the cavity 116A as follows. For example, the protrusions 119 may be provided in plural rows on the surface of the cavity 116A with a predetermined gap left therebetween in the vertical direction. Herein, the protrusions 119 may be arranged in a strip shape on the surface of the cavity 116A so as to extend in the horizontal direction. Thus, the cup-shaped portions 200 are formed as a concave groove. Moreover, the plurality of protrusions 119 may be arranged in a staggered pattern on the surface of the cavity 116A.

In each of the two split mold blocks 32A and 32B, pinch-off parts 118 are formed around the cavity 116. More specifically, the pinch-off parts 118 are formed in an annular shape around the cavity 116 so as to extend toward the opposed mold block 32A or 32B. In the case of clamping the two split mold blocks 32A and 32B, the tip ends of the pinch-off parts 118 are brought into contact with each other. As the result, the two molten thermoplastic resin sheets P1 and P2 are welded such that parting lines PL are formed on the circumferential edges thereof, respectively. Thus, the outer peripheral wall is formed to close the hollow portion.

A frame 33A is outwardly fitted in a slidable manner to the outer periphery of the mold block 32A in an enclosed state. Herein, a frame shift device (not illustrated) allows the movement of the frame 33A relative to the mold block 32A. More specifically, the frame 33A protrudes from the mold block 32A toward the mold block 32B, and therefore can come into contact with the side of the thermoplastic resin sheet P1 fed between the mold blocks 32A and 32B.

The mold drive device to be used herein is similar to a conventional one; therefore, the detailed description thereof will not be given here. The two split mold blocks 32A and 32B are driven by the mold drive device, respectively. At the open position, the two molten thermoplastic resin sheets P can be fed between the two split mold blocks 32A and 32B. At the close position, on the other hand, the pinch-off parts 118 of the two split mold blocks 32A and 32B are brought into contact with each other. When the annular pinch-off parts 118 are brought into contact with each other, a hermetic space is formed between the two split mold blocks 32A and 32B. With regard to the shift of each of the mold blocks 32A and 32B from the open position to the close position, the close position, that is, the position where the pinch-off parts 118 are brought into contact with each other corresponds to a position between the two molten thermoplastic resin sheets P1 and P2. Herein, this position is spaced equidistantly from the thermoplastic resin sheets P1 and P2. Each of the mold blocks 32A and 32B is driven by the mold drive device to move to this position. Herein, the extruding machine as well as the pair of rollers for the thermoplastic resin sheet P1 and the extruding machine as well as the pair of rollers for the thermoplastic resin sheet P2 are arranged diametrically with respect to the close position.

As illustrated in FIG. 6, a vacuum suction chamber 80 is provided inside the split mold block 32A. The vacuum suction chamber 80 communicates with the cavity 116A through suction holes 82. The thermoplastic resin sheet P1 is sucked from the vacuum suction chamber 80 through the suction holes 82 and, thereby, is adsorbed toward the cavity 116A. As the result, the thermoplastic resin sheet P1 is shaped in accordance with the outer surface of the cavity 116A. More specifically, the protrusions 119 provided on the outer surface of the cavity 116A allow the formation of the cup-shaped portions 200 on the outer surface 117 of the thermoplastic resin sheet P1 serving as the back-side sheet 120B. On the other hand, the split mold block 32B is provided with conventionally known blow pins (not illustrated) capable of applying a blowing pressure through the hermetic space formed between the mold blocks 32A and 32B at the time of clamping the mold blocks.

The thermoplastic resin sheets P1 and P2 serving as the front-side sheet 120A and back-side sheet 120B each correspond to a sheet made of an olefinic resin such as polyethylene or polypropylene, a noncrystalline resin, or the like. Preferably, each of the thermoplastic resin sheets P1 and P2 is made of a resin with excellent melt tension in terms of the prevention of variations in wall thickness caused by drawdown, neck-in or the like. On the other hand, preferably, each of the thermoplastic resin sheets P1 and P2 is made of a resin with excellent fluidity in order to improve transferability and followability to the mold block.

More specifically, such a resin may be a polyolefin (e.g., polypropylene, high density polyethylene) which is a homopolymer or a copolymer of olefins such as ethylene, propylene, butene, isoprene, pentene and methylpentene. Herein, the polyolefin has a feature that an MFR (measured according to JIS K-7210 at a test temperature of 230° C. under a test load of 2.16 kg) at 230° C. is not more than 3.0 g/10 min, more preferably 0.3 to 1.5 g/10 min. Alternatively, such a resin may be a noncrystalline resin such as an acrylonitrile-butadiene-styrene copolymer, polystyrene, high-impact polystyrene (HIPS resin) or an acrylonitrile-styrene copolymer (AS resin). Herein, the noncrystalline resin has features that an MFR (measured according to JIS K-7210 at a test temperature of 200° C. under a test load of 2.16 kg) at 200° C. is 3.0 to 60 g/10 min, more preferably 30 to 50 g/10 min, and a melt tension (indicating a tension in a case where a strand is extruded from an orifice having a diameter of 2.095 mm and a length of 8 mm at a residual heat temperature of 230° C. and an extrusion rate of 5.7 mm/min, and then is wound around a roller having a diameter of 50 mm at a winding rate of 100 rpm, the tension being measured using a melt tension tester manufactured by Toyo Seiki Seisaku-Sho, Ltd.) at 230° C. is not less than 50 mN, preferably not less than 120 mN.

In order to prevent cracking caused by impact, preferably, each of the thermoplastic resin sheets P1 and P2 contains a hydrogenated styrene thermoplastic elastomer at a ratio less than 30 wt %, preferably a ratio less than 15 wt %. Concretely, preferable examples of the hydrogenated styrene thermoplastic elastomer may include a styrene ethylene butylene styrene block copolymer, a styrene ethylene propylene styrene block copolymer, a hydrogenated styrene butadiene rubber, and a mixture thereof. Preferably, the hydrogenated styrene thermoplastic elastomer has features that a styrene content is less than 30 wt %, preferably less than 20 wt %, and an MFR (measured according to JIS K-7210 at a test temperature of 230° C. under a test load of 2.16 kg) at 230° C. is 1.0 to 10 g/10 min, preferably not more than 5.0 g/10 min and not less than 1.0 g/10 min. Further, each of the thermoplastic resin sheets P1 and P2 may contain an additive. Examples of the additive may include an inorganic filler made of silica, mica, talc, calcium carbonate, glass fiber, carbon fiber and the like, a plasticizer, a stabilizer, a colorant, an antistatic agent, a fire retardant, a foaming agent and the like. Concretely, silica, mica, glass fiber or the like is added to a molding resin in an amount of not more than 50 wt %, preferably 30 to 40 wt %.

In the case of providing the decorative material sheet 140 on the surface of the thermoplastic resin sheet P2 serving as the front-side sheet 120A, the decorative material sheet 140 is formed for improvement in outward appearance, ornamental purposes, and protection of articles coming into contact with the molded product (e.g., cargos to be mounted on the top of a cargo floor board). The decorative material sheet 140 may be formed using a fiber skin material, a sheet-like skin material, a film-like skin material or the like. The fiber skin material may be made of a synthetic fiber such as polyester, polypropylene, polyamide, polyurethane, acryl or vinylon, a semisynthetic fiber such as acetate or rayon, a regenerated fiber such as viscous rayon or cupurammonium rayon, a natural fiber such as cotton, hemp, wool or silk, or a blend fiber thereof.

Among these examples, the fiber skin material is made of preferably polypropylene or polyester, more preferably polyester, in terms of feel, durability and moldability. Preferably, a yarn for use in the fiber skin material is a combination of a staple spun yarn of polyester, a multi-filament of polyester and a thick mono-filament of polyester. The polyester spun yarn is 3 to 5 deniers×50 to 100 mm (i.e., has a fineness of 3 to 5 deniers and a fiber length of about 2 to 5 inches). Moreover, the polyester multi-filament is a bunch of thin soft filaments. As one example, the polyester multi-filament may be a multi-filament that satisfies a relation of about 150 to 1000 deniers/30 to 200 filaments=about 5 deniers×30 to 200 filaments. The thick mono-filament is a polyester yarn that satisfies a relation of 400 to 800 deniers/1 filament, for example.

Examples of a composition of the decorative material sheet 140 may include a nonwoven fabric, a woven fabric, a knitted fabric, a raised cloth thereof, and the like. Examples of the woven fabric include a plain weave in which each warp yarn passes over one and under one weft yarn and each weft yarn passes over one and under one warp yarn, and various twill weaves in which each warp yarn passes over several and under several weft yarns and each weft yarn passes over several and under several warp yarns. Among these examples, a nonwoven fabric is used preferably for the following reason. That is, the nonwoven fabric has no directional property about elongation, and therefore is molded readily into a three-dimensional shape and is excellent in the feel and texture of a surface. Herein, the nonwoven fabric indicates a cloth-like product in which fibers are stacked in parallel or by alternation, or are distributed at random to form a web, and fibers each made as a web are bonded together. Among these examples, a nonwoven fabric to be preferable herein is manufactured by a needle punching method in terms of the three-dimensional shape reproducibility and outward appearance property of a molded product. Moreover, the nonwoven fabric obtained by the needle punching method is lower in strength and larger in elongation than a woven fabric. Further, the nonwoven fabric is larger than a woven fabric in a degree of deformation in a given direction. In order to improve the strength of the nonwoven fabric and stabilize the dimension of the nonwoven fabric, preferably, a binder is attached to a woven fabric or a web and a nonwoven fabric are punched by lapping. In view of the foregoing description, preferably, the decorative material sheet 140 is a polypropylene nonwoven fabric or a polyester nonwoven fabric. In this case, the decorative material sheet 140 itself exhibits a thermoplastic property. After the separation and recovery, therefore, the decorative material sheet 140 which is deformed by heat application can be used for different purposes. For example, a molded product includes a main resin layer formed of polypropylene and a decorative material sheet 140 formed of a polypropylene nonwoven fabric. As the result, the molded product can be recycled with ease because the main resin layer and the decorative material sheet 140 are equal in raw material to each other.

On the other hand, if the decorative material sheet 140 is made of a polyester nonwoven fabric, a main resin layer formed of polypropylene and a fiber skin material are different in melting point from each other. Therefore, it is possible to prevent such problems that a decorative material sheet 140 to be bonded to a molded product is altered or deformed because of heat and cannot be bonded to an appropriate position. In this case, moreover, the decorative material sheet 140 is excellent in moldability, stiffness, outward appearance and durability. In the decorative material sheet 140, a tensile strength is preferably not less than 15 kg/cm$^2$ and an elongation is preferably not less than 30% in terms of three-dimensional shape reproducibility and moldability. Herein, the values of the tensile strength and elongation are each measured according to JIS K-7113 at a temperature of 20° C. A sheet-like skin material or a film-like skin material to be used herein may be a thermoplastic elastomer, a resin layer subjected to embossing, a resin layer having a print layer formed on an outer surface thereof, a synthetic leather, a non-slip mesh-shaped skin layer, or the like.

A method for manufacturing the laminate 100 having the configuration described above by use of the molding apparatus 10 for manufacturing the laminate 100 will be described below with reference to the drawings. In FIG. 4, first, molten and kneaded thermoplastic resins are retained in a predetermined amount in the accumulators 22. The retained thermoplastic resins are extruded intermittently from the extrusion slits 34 provided on the T-dies 28 and spaced away from each other at a predetermined gap, in a predetermined extrusion amount per unit time. As the result, the thermoplastic resin swells, and is extruded at a predetermined extrusion rate so as to droop downward. Herein, the thermoplastic resin is formed in a molten sheet shape and has a predetermined thickness.

Next, the pair of rollers 30 are shifted to the open position, so that the gap between the pair of rollers 30 located below the extrusion slits 34 becomes larger than the total thickness of the thermoplastic resin sheets P. Thus, the lowest portions of the molten thermoplastic resin sheets P each extruded downward are fed smoothly between the pair of rollers 30. Herein, the timing that the gap between the rollers 30 becomes larger than the total thickness of the thermoplastic resin sheets P may be set at a timing that secondary molding is complete every one shot, rather than the timing after the start of extrusion. Next, the pair of rollers 30 are brought into close to each other and are shifted to the close position. As the result, the gap between the pair of rollers 30 becomes smaller, so that the thermoplastic resin sheets P are nipped. The thermoplastic resin sheets P are fed downward by the rotation of the roller. As illustrated in FIG. 4, next, the thermoplastic resin sheets P each having a uniform thickness in the direction of extrusion are fed between the split mold blocks 32A and 32B located below the pair of rollers 30. Thus, the positions of the thermoplastic resin sheets P are set such that the thermoplastic resin sheets P protrude around the pinch-off parts 118. The steps described above are carried out on the two thermoplastic resin sheets P1 and P2. The thermoplastic resin sheet P2 serving as the front-side sheet 120A and the thermoplastic resin sheet P1 serving as the back-side sheet 120B are fed between the split mold blocks 32A and 32B while being spaced away from each other. In this case, the thicknesses of the two thermoplastic resin sheets P1 and P2 fed between the split mold blocks 32A and 32B can be changed independently of each other by the adjustment of the gap between the extrusion slits 34 or the adjustment of the rotation speeds of the pair of rollers 30.

More specifically, the thermoplastic resin sheet P1 serving as the back-side sheet 120B has the plurality of cup-shaped portions 200 formed thereon. As the result, the thermoplastic resin sheet P1 is elongated along the protrusion in the cavity of the mold block at the time of molding. Therefore, the thermoplastic resin sheet P1 tends to be smaller in thickness than the thermoplastic resin sheet P2 serving as the front-side sheet 120A having no cup-shaped portions 200 formed thereon. As will be described later, however, when the width of the extrusion slit 34A is set to be larger than the width of the extrusion slit 34B, for example, the thermoplastic resin sheet P1 serving as the back-side sheet 120B can be made larger in thickness. Thus, when the back-side sheet 120B and the front-side sheet 120A are welded together to obtain the laminate 100 by the clamping of the split mold blocks 32A and 32B, the thickness of the back-side sheet 120B and the thickness of the front-side sheet 120A can be set to be substantially equal to each other. As illustrated in FIG. 5, next, the frame 33A is shifted relative to the mold block 32A toward the thermoplastic resin sheet P1 serving as the back-side sheet 120B so as to come into contact with the outer surface 117 of the thermoplastic resin sheet P1 opposed to the mold block 32A. Herein, it is advised that the decorative material sheet 140 droops in advance along the cavity plane while being held appropriately above the mold block. It is recommended that the decorative material sheet 140 is fed until the mold blocks 32 are clamped.

As illustrated in FIGS. 5 and 6, next, the thermoplastic resin sheet P1 is pressed against the cavity 116A by the suction of air in the first hermetic space 84, which is formed with the cavity 116A of the mold block 32A, the inner circumferential surface 102 of the frame 33A and the outer surface 117 of the thermoplastic resin sheet P1 opposed to the mold block 32A, from the vacuum suction chamber 80 through the suction hole 82. Thus, the thermoplastic resin sheet P1 is shaped in accordance with the irregular surface of the cavity 116A. As the result, the plurality of cup-shaped portions 200 are formed on the back-side sheet 120B.

As illustrated in FIG. 7, next, the mold blocks 32A and 32B are shifted to come close to each other until the annular pinch-off parts 118A and 118B thereof come into contact with each other while the thermoplastic resin sheet P1 is held by suction in the state that the frame 33A coming into contact with the outer surface 117 of the thermoplastic resin sheet P1 is fixed. In this case, the contact position of the pinch-off parts 118A and 118B in the direction of clamping is located between the two thermoplastic resin sheets P1 and P2 spaced away from each other. As illustrated in FIG. 7, however, since the pinch-off parts 118A and 118B come into contact with each other, the peripheral edges of the two thermoplastic resin sheets P1 and P2 are welded and fixed to each other. Further, the butt planes 240 of the large number of cup-shaped portions 200 formed on the surface of the back-side sheet 120B are welded to the inner surface of the front-side sheet 120A. Thus, the hermetic hollow portion 280 is formed between the back-side sheet 120B and the front-side sheet 120A. As illustrated in FIG. 8, next, the molded laminate 100 is taken out in such a manner that the split mold blocks 32A and 32B are separated from each other. Then, a burr B formed at the outside of the pinch-off parts 118A and 118B is cut. Thus, the molding is completed.

Thus, the steps described above are carried out repeatedly every time molten thermoplastic resin sheets P are extruded intermittently, so that sheet-like laminates 100 can be molded successively. Moreover, since a thermoplastic resin is extruded as a molten thermoplastic resin sheet P intermittently by extrusion molding, the thermoplastic resin sheet P extruded by vacuum molding or air pressure molding can be shaped in a predetermined shape by use of a mold.

The method for manufacturing the resin laminate 100 having the configuration described above enables to solve the following problem according to the related art. That is, as to the blow molding using a tubular parison, in the case where the wall thickness of the tubular parison in the circumferential direction can not be adjusted with ease, when a blowing pressure is applied inside the parison after the clamping of mold blocks, the thickness of a molded sheet is reduced locally in accordance with a blow ratio. In other words, the method enables to produce the following advantage. That is, in a state that two thermoplastic resin sheets subjected to thickness adjustment independently of each other are fed between the split mold blocks 32A and 32B, the hermetic space is formed between one of the resin sheets and the cavity 116 of the mold block opposed to this resin sheet, and then is the suction of air in the hermetic space is effected from the mold block side. As the result, the thicknesses of the two resin sheets can be reduced at a maximum level that the required strength and moldability are ensured, independently of each other, to a degree of the thermoplastic resin sheet to be elongated in accordance with the shape of the cavity. Thus, it is possible to achieve satisfactory reduction in weight and wall thickness while ensuring manufacture efficiency and product quality.

Although the present invention has been fully described in connection with the preferred embodiment thereof, those skilled in the art will readily conceive numerous changes and modifications unless they depart from the scope of the present invention. In the foregoing description according to this embodiment, for example, the shaping is effected by the suction to be effected before the clamping of the split mold blocks; however, the present invention is not limited thereto. For example, the blowing pressure may be applied after the clamping of the split mold blocks in accordance with a pattern to be formed on a surface of a sheet. Alternatively, a pressure may be applied to the thermoplastic resin sheets P1 and P2 through a second hermetic space 86 formed with the mold block 32A and the mold block 32B, and the thermoplastic resin sheet P1 may be sucked in the first hermetic space 84 from the mold block 32A side.

Also in the foregoing description according to this embodiment, the laminate 100 is shaped and molded directly, using an extruded and sheet-like molten parison; however, the present invention is not limited thereto. The laminate 100 may be shaped and molded in such a manner that a thermoplastic resin sheet, which has been subjected to extrusion molding and then cooled, is molten again by application of heat, as long as a molten state required for the shaping and molding is achieved.

Also in the foregoing description according to this embodiment, when being fed between the pair of mold blocks, the front-side sheet 120A droops along the cavity plane while being held above the mold block; however, the present invention is not limited thereto. The mold blocks may be clamped in a state that the decorative material sheet 140 sucked from the mold block 32B side is located in the cavity 116B. Alternatively, the front-side sheet 120A, to which the decorative material sheet 140 is bonded in advance, may be placed in the cavity 116B.

A case of using the resin laminate according to the present invention as a support plate of a deck board for automobiles will be described below as an example of the embodiment of the present invention. FIGS. 9A to 9C are partial sectional views each illustrating details of an outer peripheral wall of a vehicle interior product 100 corresponding to the resin laminate. As illustrated in FIGS. 9A to 9C, a hermetic hollow portion 280 is formed between a front-side skin material sheet 120A and a back-side skin material sheet 120B, which is formed by an inner surface 180 of the back-side skin material sheet 120B, an inner surface 170 of the front-side skin material sheet 120A, and an outer surface of a rib 122. The hermetic hollow portion 280 is enclosed with an outer peripheral wall of the back-side skin material sheet 120B at a circumferential end surface of the laminated structure board 100.

As illustrated in FIG. 9A, the decorative material sheet 140 and the front-side skin material sheet 120A each have an edge 290 formed in such a manner that a circumferential edge thereof is bent toward a certain side, and the back-side skin material sheet 120B has an edge 292 formed in such a manner that a circumferential edge thereof is bent in a certain side. The outer peripheral wall has an outer peripheral surface formed by the butting of an end circumferential surface 294 directed to one of two sides of the edge 290 of each of the decorative material sheet 140 and the front-side skin material sheet 120A against an end circumferential surface 296 directed to one of two sides of the edge 292 of the back-side skin material sheet 120B. Thus, since the outer peripheral surface of the outer peripheral wall is formed by the outer peripheral surface of the decorative material sheet 140 and the outer peripheral surface of the back-side skin material sheet 120B, a parting line is formed on an outer peripheral surface of a butt portion so as to extend in a circumferential direction. Herein, the outer peripheral surface of the decorative material sheet 140 and the outer peripheral surface of the back-side skin material sheet 120B communicate with each other without irregularities. According to this configuration, the parting line corresponding to the boundary between the outer peripheral surface of the decorative material sheet 140 and the outer peripheral surface of the back-side skin material sheet 120B is formed without a joint or a difference in height. Hence, it is possible to ensure an aesthetic design concerning an outward appearance.

FIG. 9B illustrates a modification of the configuration illustrated in FIG. 9A. As illustrated in FIG. 9B, the decorative material sheet 140 and the front-side skin material sheet 120A each have the edge 290 formed in such a manner that the circumferential edge thereof is bent toward a certain side. On the other hand, the back-side skin material sheet 120B is formed in a flat shape including the circumferential edge thereof. Thus, the outer peripheral surface of the outer peripheral wall may be formed by the butting of the end circumferential surface 294 directed to one of the two sides of the edge 290 of each of the decorative material sheet 140 and the front-side skin material sheet 120A against the inner surface 180 of the back-side skin material sheet 120B.

FIG. 9C illustrates another modification of the configuration illustrated in FIG. 9A. Each of the decorative material sheet 140 and the front-side skin material sheet 120A is formed in a flat shape including the circumferential edge thereof. On the other hand, as in the configuration illustrated in FIG. 9A, the back-side skin material sheet 120B has the edge 292 formed in such a manner that the circumferential edge thereof is bent toward a certain side. Thus, the outer peripheral surface of the outer peripheral wall may be formed by the butting of the inner surface 170 of the front-side skin material sheet 120A with the end circumferential surface 296 directed to one of the two sides of the edge 292 of the back-side skin material sheet 120B. According to the configuration illustrated in FIG. 9B, particularly, when the vehicle interior product 100 is fitted to a recess such that the decorative material 140 is bare at the inside of the vehicle, the parting line is formed at the downward position. Therefore, the configuration illustrated in FIG. 9B is advantageous in terms of improvement in aesthetic design concerning an outward appearance as compared with the configurations illustrated in FIGS. 9A and 9C. The following description is given about the functional effects of the vehicle interior product 100 having the configuration described above.

FIG. 10 illustrates a state that the vehicle interior product 100 is attached to a deck board 300 of an automobile. FIG. 11 is a perspective view illustrating the vehicle interior product 100 to be used as illustrated in FIG. 10. The vehicle interior product 100 is used as a blind for covering a dead space 308 formed with the deck board 300 and a rear seat 306 including a cushion seat 302 and a back seat 304 provided so as to be tilted with respect to the cushion seat 302. More specifically, the vehicle interior product 100 is provided between the rear seat 306 and the deck board 300 in a state that a hinge axis to be formed by a concave groove extends in a vehicle widthwise direction.

In normal cases, the vehicle interior product 100 has a fixed part to be fastened with a screw or the like to the recess 312 of the deck board 300. In such a fixed state, a movable part 316 is turned with respect to the fixed part 310 through a hinge part 314 such that a tip end of the movable part 316 leans against a back 318 of the back seat 304. When the back seat 304 is folded forward, the movable part 316 turns forward through the hinge part 314 and, then, is mounted on a recess 320 formed on the back 318 of the back seat 304. Thus, the vehicle interior product 100 serves as the blind for the dead space 308 with the decorative material sheet 140 thereof being bare at the inside of the vehicle. Moreover, the back 318 of the back seat 304, the outer surface of the decorative material sheet 140 of the vehicle interior product 100, and the top of the deck board 300 are flush with one another. As the result, a long article that extends in a vehicle lengthwise direction, for example, ski equipment can be mounted on the flat plane.

Herein, the depth of the recess may be adjusted appropriately, so that the vehicle interior product 100 can be laid between the recess 312 of the deck board 300 and the recess 320 of the back seat 304 without a difference in height between the outer surface of the decorative material sheet 140 and the top of the deck board 300 or the back 318 of the back seat 304. Further, the outer surface of the decorative material sheet 140 is allowed to have a strength without flexure due to a weight of baggage to be placed thereon or without deformation due to vibration to be generated at the running of the vehicle. The vehicle interior product 100 may be molded using so-called integral molding or may be molded separately.

In the former case, two molten thermoplastic resin sheets P to be fed between two split mold blocks may be molded by clamping of the two split mold blocks. More specifically, this molding method may involve a step of providing a pair of split mold blocks one of which has a cavity provided with a plurality of protrusions each extending toward the other one, a step of feeding two molten thermoplastic resin sheets, which are spaced away from each other at a predetermined gap and serve as a back-side skin material sheet 120B and a front-side skin material sheet 120A, between the pair of split mold blocks such that the two sheets protrude around welded portion forming parts arranged annually, a step of forming a hermetic space between the one sheet serving as the back-side skin material sheet 120 and the cavity of the one mold block opposed to an outer surface of the one sheet, a step of sucking air in the hermetic space from the one mold block side, pressing the outer surface of the one sheet against the cavity of the one mold block to shape the one sheet, and forming cup-shaped portions, and a step of clamping the pair of mold blocks, welding circumferential edges of the two molten thermoplastic resin sheets to each other and welding the bottom of each cup-shaped portion formed on the one sheet to an inner surface of the other sheet. In this case, the decorative material sheet 140 may be held in advance by suction on the other mold block opposed to the thermoplastic resin sheet serving as the front-side skin material sheet 120A. Thus, by the clamping of the pair of mold blocks, the welded portion forming parts arranged annually on the circumferential edge forms the outer peripheral wall. As the result, it is possible to manufacture a vehicle interior product which does not degrade an aesthetic design of a circumferential edge and has a space formed therein, without performing facing treatment.

According to this molding method, in accordance with the use of the vehicle interior product 100, the hermetic hollow portion 280 can be formed at a desired position between the front-side skin material sheet 120A and the back-side skin material sheet 120B. Moreover, the vehicle interior product 100 can be manufactured to have a desired surface profile (flat or curved). Further, the welding of the front-side skin material sheet 120A and the back-side skin material sheet 120B allows the resultant vehicle interior product 100 to desirably realize a contour or a surface profile and an inner structure according to the use of the vehicle interior product 100. Particularly, the parting line is formed by the welding of the circumferential edge surfaces of the front-side skin material sheet 120A and back-side skin material sheet 120B, so that the hermetic hollow portion 280 is formed.

Particularly, the molding may be effected by use of primary molding and secondary molding. In other words, the molten thermoplastic resin sheet serving as the back-side skin material sheet 120 and the molten thermoplastic resin sheet serving as the front-side skin material sheet 120A, which are extruded by extrusion molding, may be fed between the pair of split mold blocks while being molten. According to this method, sheet-like vehicle interior products 100 can be molded successively every time the molten resins are extruded intermittently by the primary molding. As the result, the thermoplastic resin is extruded intermittently as a molten thermoplastic resin sheet P by extrusion molding (primary molding). Then, the thermoplastic resin sheet P extruded by vacuum molding (secondary molding) can be subjected to integral molding using split mold blocks. In the latter case, on the other hand, the front-side skin material sheet 120A, the back-side skin material sheet 120B and the decorative material sheet 140 may be molded independently of one another by extrusion molding, ejection molding or the like. These sheets molded independently of one another may be bonded with an adhesive or welded by vibration.

The vehicle interior product having the configuration described above is a laminated structure component including a front-side skin material sheet 120A to which a decorative material layer is bonded, and a back-side skin material sheet 120B. This laminated structure component may be provided such that the decorative material is bare at the inside of a vehicle. In the laminated structure component, the back-side skin material sheet 120B is provided with a plurality of cup-shaped portions 200 each having a bottom bonded to a surface of the front-side skin material sheet 120A opposed to the surface to which the decorative material layer is bonded. The plurality of cup-shaped portions 200 are provided without restrictions regarding arrangement so as to realize a contour, particularly, a thickness to be required in accordance with a state of a component on which the vehicle interior product is mounted. Accordingly, when the height of a rib that forms the cup-shaped portion is adjusted appropriately, the laminated structure component is substantially allowed to have a required thickness. Further, the provision of the plurality of cup-shaped portions 200 allows achievement of reduction in weight. On the other hand, a space formed by the front-side skin material sheet 120A and the back-side skin material sheet 120B is enclosed with an outer peripheral wall of the back-side skin material sheet 120B at a circumferential end surface of the laminated structure component. The outer peripheral wall has an outer peripheral surface formed by an outer peripheral surface of the decorative material sheet 140 and an outer peripheral surface of the back-side skin material sheet 120B. The outer peripheral surface of the decorative material sheet 140 and the outer peripheral surface of the back-side skin material sheet 120B communicate with each other without irregularities. Therefore, an outward appearance of an interior product, particularly, an aesthetic design of a circumferential end can be maintained without facing treatment. Thus, it is possible to achieve weight reduction while realizing a contour of an interior product suitable for attachment and to provide an excellent aesthetic design concerning an outward appearance. Next, a second embodiment of the present invention will be described below in detail with reference to the drawings. In the following description, constituent elements similar to those in the first embodiment are denoted with like reference signs; therefore, the detailed description thereof will not be given here. The following description is given about the details of a feature in this embodiment.

The feature of this embodiment is different from that of the first embodiment in the following point. That is, the arrangement of the cup-shaped portions 200 is devised to form a so-called fold, which is plate-like rib piece, between the adjacent cup-shaped portions 200 in the space formed by the front-side skin material sheet 120A and the back-side skin material sheet 120B. By use of this fold, the interior product is improved in lengthwise flexure stiffness. The plurality of cup-shaped portions 200 are arranged in the hermetic hollow portion 280 with a certain gap left therebetween. This gap is required for forming a fold 124, which is a plate-like rib piece and extends from the inner surface 180 of the back-side skin material sheet 120B toward the front-side skin material sheet 120A, between the adjacent cup-shaped portions 200.

The following description is given about a more specific configuration. In the first embodiment illustrated in FIG. 1, the plurality of cup-shaped portions 200 are arranged in a honeycomb pattern. In this embodiment illustrated in FIG. 12, on the other hand, the plurality of cup-shaped portions 200 are arranged such that the vertexes of adjacent openings 260 come closest to each other, on the outer surface of the back-side skin material sheet 120B. This configuration is described more specifically. In the configuration illustrated in FIG. 1, for example, the adjacent regular hexagonal openings are arranged such that the opposed sides become parallel. The gap between the sides corresponds to the gap between the adjacent openings. In the configuration illustrated in FIG. 12, on the other hand, with regard to the adjacent regular hexagonal openings, one of the vertexes of each regular hexagonal opening is located on a line connecting between the centers of these openings. Therefore, the gap between these vertexes corresponds to the gap between the adjacent openings. In the case of realizing the arrangement of these openings, when the vehicle interior product 100 is molded by vacuum molding, the so-called fold is formed between the adjacent cup-shaped portions 200 (more accurately, between the outer surfaces of the ribs 122 forming the adjacent cup-shaped portions 200), as will be described later.

That is, in order to form the fold, it is sufficient that the vehicle interior product is molded by vacuum molding using the split mold blocks, as described in the first embodiment. The thermoplastic resin sheet is pressed against the cavity in such a manner that air in the hermetic space formed by the clamping of the split mold blocks is sucked from the one mold block side. Thus, the thermoplastic resin sheet is shaped. Herein, it is advisable that the fold, which is a plate-like rib, is formed by use of the following fact. That is, the resin is not elongated to the root portions of the adjacent protrusions on the cavity, at the position where the protrusions come close to each other.

More specifically, the fold 124 is generated because of the following reason irrespective of vacuum molding or blow molding. That is, the plurality of cup-shaped portions 200 are formed on the outer surface of the back-side skin material sheet 120B in such a manner that the thermoplastic resin sheet serving as the back-side skin material sheet 120B is pressed against the protrusions provided on the cavity of the mold block. More specifically, the plurality of protrusions are provided on the cavity in response to the plurality of recesses 200. In a portion where a gap between the adjacent protrusions is narrow, it is difficult to elongate by shaping the molten thermoplastic resin sheet to a degree that the molten resin sheet reaches the front-side skin material sheet 120A, as compared with a portion other than the portion. For this reason, a plate-like wrinkle is formed to extend rectilinearly and communicate between the adjacent protrusions. As illustrated in FIGS. 13 and 14, the fold 124 has a substantially V-shaped section which extends from the inner surface 180 of the back-side skin material sheet 120B toward the front-side skin material sheet 120A. Herein, the fold 124 extends in the thickness direction of the vehicle interior product 100, and the top 125 thereof terminates forward of the inner surface of the front-side skin material sheet 120A. As described above, the gap between the adjacent protrusions is important for forming the desired fold 124. In the case where the plurality of cup-shaped portions 200 are arranged as illustrated in FIG. 12, the fold is formed to encompass a ridge of the rib 122 that extends from the vertexes of the adjacent openings 260, which come closest to each other, toward the front-side skin material sheet 120A. With regard to this point, in the case where the plurality of cup-shaped portions 200 are arranged in a honeycomb pattern as illustrated in FIG. 1, no portion where a gap between the adjacent openings is narrow locally is formed as illustrated in FIG. 12. Therefore, such a fold is formed hardly.

Moreover, in the case where the thermoplastic resin sheet serving as the back-side skin material sheet 120B is extruded downward in the vertical direction by primary molding and then is fed between the split mold blocks, although the gap between the adjacent cup-shaped portions 200 is invariant, as illustrated in FIG. 13, the fold 124 is formed between the adjacent cup-shaped portions 200 in a D1 direction (a direction of extrusion) illustrated in FIG. 12. As illustrated in FIG. 15, on the other hand, no fold is formed between the adjacent cup-shaped portions 200 in a D2 direction or a D3 direction illustrated in FIG. 12. The reason therefor is considered as follows. That is, the fold is formed with ease in the vertical direction rather than the horizontal direction in relation to the gravity to be acted on the molten thermoplastic resin sheet. In view of this characteristic, normally, a rectangular vehicle interior product having a longer side extending in a direction of extrusion is lack in flexure stiffness in the direction of extrusion; however, a fold to be formed along the direction of extrusion can reinforce the flexure stiffness in the direction of extrusion.

As described above, when the arrangement of the plurality of cup-shaped portions 200 is adjusted without restrictions, the fold 124 is formed positively in the hermetic hollow portion 280 by vacuum molding so as to extend from the inner surface 180 of the back-side skin material sheet 120B toward the front-side skin material sheet 120A between the adjacent cup-shaped portions 200. Thus, the root portions of the plurality of cup-shaped portions 200 in the vicinity of the openings 260 provided on the outer surface 220 of the back-side skin material sheet 120B are reduced in thickness. This may cause the lack of strength as a structure reinforcing member. However, reduction in weight can be achieved by the fold 124 that forms a plate-like rib piece for communicating between the adjacent cup-shaped portions 200. Moreover, the vehicle interior product 100 can ensure a total thickness to be required. Further, a strength to be required for maintaining the contour of an interior product can be ensured uniformly as the entire interior product. Moreover, the adjustment of the gap between the adjacent cup-shaped portions 200 is allowed to form the fold 124 having a desired thickness D and a desired height H (see FIG. 14). Particularly, the fold 124 allows the vehicle interior product 100 to have bending stiffness in the thickness direction. Further, the stiffness can be adjusted locally by the adjustment of the distribution of the fold 124 on the vehicle interior product 100.

Heretofore, the formation of such a fold is considered as unpreferable because of the following reason. That is, as illustrated in FIG. 12, because of the formation of the fold, a linear trace L that connects between the adjacent cup-shaped portions 220 is left on the outer surface 220 of the back-side skin material sheet 120B. This linear trace L degrades the aesthetic design of the outer surface 220 of the back-side skin material sheet 120B. In the case of the interior product according to the present invention, the decorative material sheet 140 laminated on the outer surface 150 of the front-side skin material sheet 120A is visually seen from the inside of a vehicle, and therefore importance is placed on an aesthetic design concerning an outward appearance. The outer surface 220 of the back-side skin material sheet 120B is not seen from the inside of the vehicle since the interior product is attached. For this reason, the generation of the linear trace L causes no problems concerning the outward appearance. Particularly, a fold to be formed in the lengthwise direction of the rectangular interior product is used for improvement in stiffness, and therefore can reinforce the drawback that the flexure stiffness in the lengthwise direction is inferior to that in the widthwise direction.

Although the present invention has been fully described in connection with the preferred embodiment thereof, those skilled in the art will readily conceive numerous changes and modifications unless they depart from the scope of the present invention. For example, an interior product intended for automobiles is described in the first embodiment; however, the present invention is not limited thereto. Such an interior product is applicable to not only general vehicles such as trains, airplanes and ships but also specific vehicles such as vehicles in an amusement park. In the case of specific vehicles, particularly, an interior product made of resin is suitable because importance is placed on an aesthetic design concerning an outward appearance including color aimed at children. Moreover, a planar interior product is described in the first embodiment; however, the present invention is not limited thereto. For example, such an interior product is applicable to floor materials, instrument panels and the like each having a three-dimensional shape. This use is allowed to achieve reduction in weight, maintain stiffness capable of holding a contour and ensure a thickness to be required. Further, a case of forming a fold only in one direction is described in the second embodiment; however, the present invention is not limited thereto. For example, by adjusting arrangement of a plurality of cup-shaped portions, a fold is formed between the adjacent cup-shaped portions without fail in the direction of extrusion. As the result, the entire interior product thus obtained may be reinforced uniformly.

Figure 1:
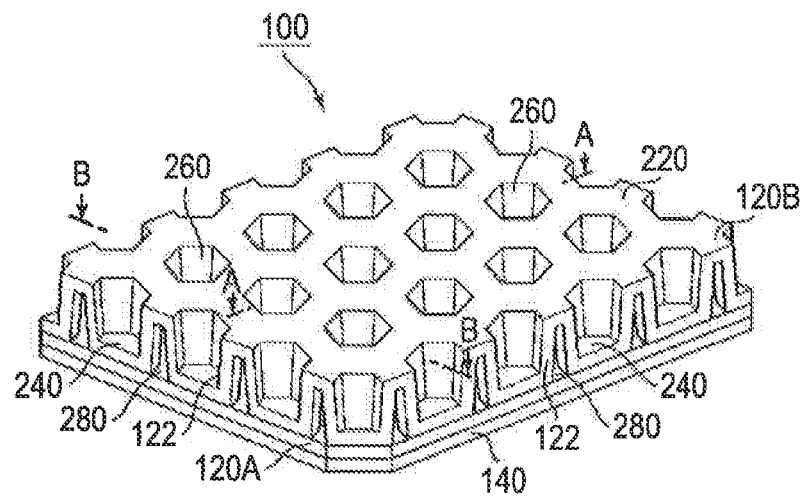
FIG. 1 is a perspective view illustrating a resin laminate according to an embodiment of the present invention.
Figure 2:
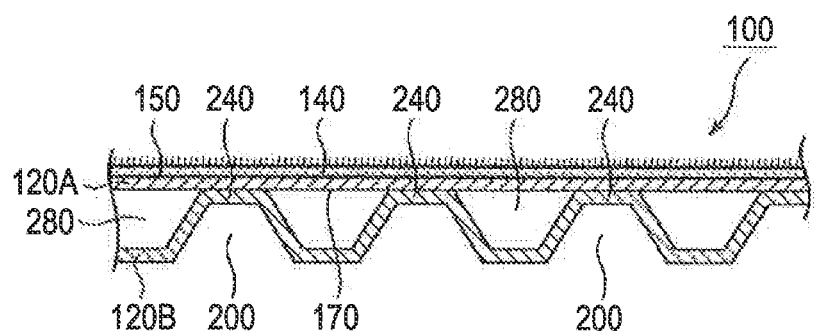
FIG. 2 is a sectional view taken along line A-A in FIG. 1.
Figure 3:
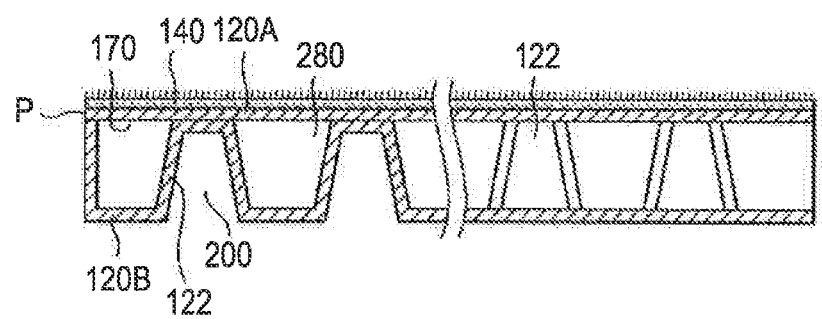
FIG. 3 is a general view illustrating the resin laminate according to the embodiment of the present invention.
Figure 4:
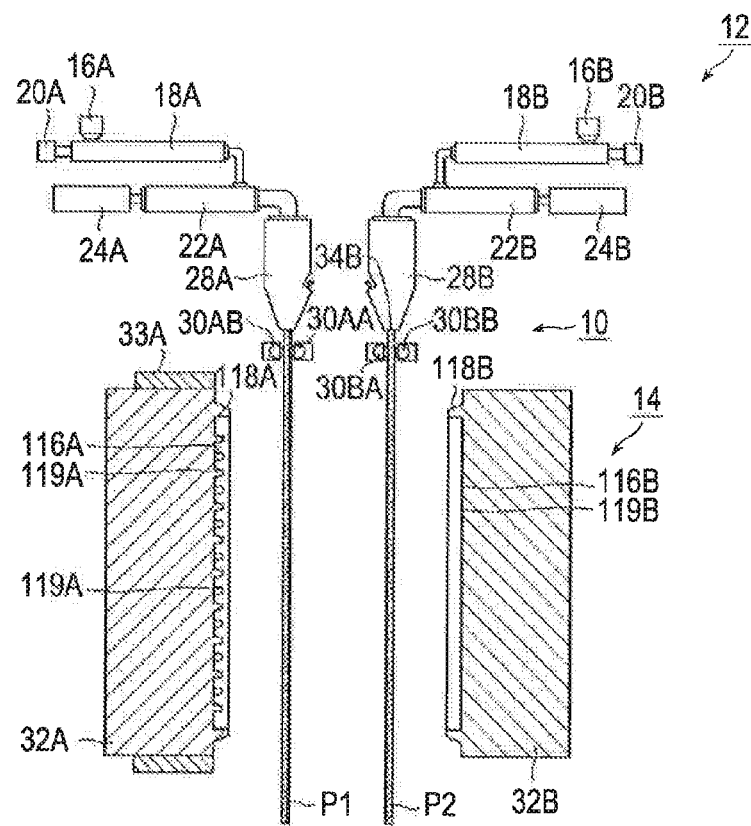
FIG. 4 is a side view illustrating a molding apparatus according to an embodiment of the present invention in a state that molten resin sheets are fed between split mold blocks.
Figure 5:
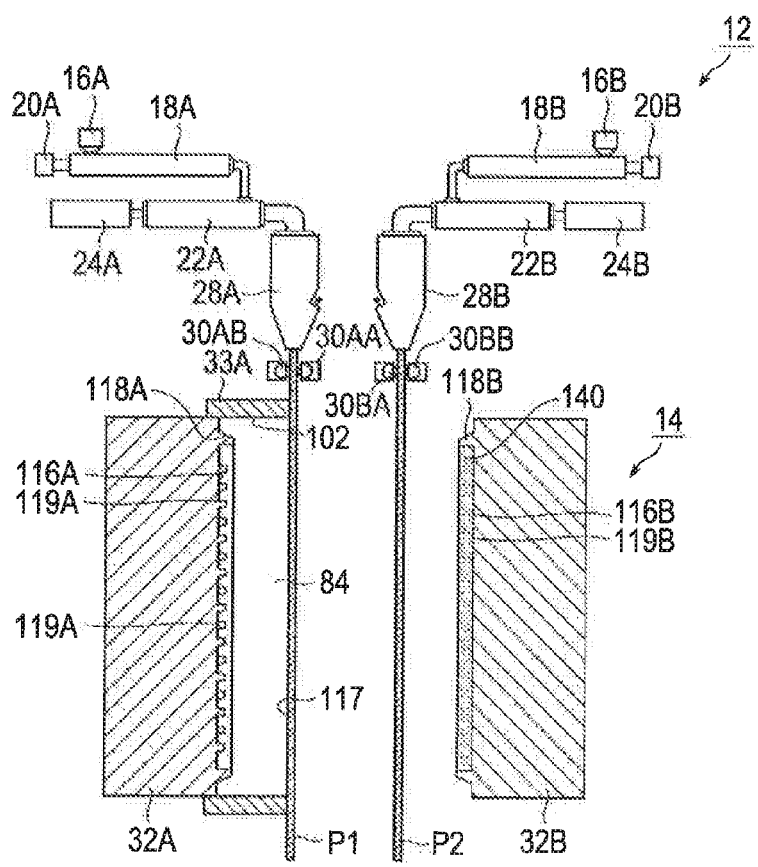
FIG. 5 is a schematic side view illustrating the molding apparatus according to the embodiment of the present invention in a state that a frame for the split mold blocks is brought into contact with a side of the molten resin sheet.
Figure 6:
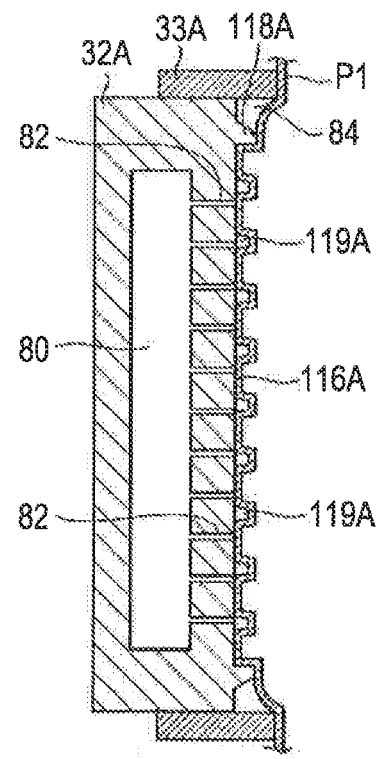
FIG. 6 is a schematic partial sectional view illustrating the molding apparatus according to the embodiment of the present invention in a situation that the molten resin sheets are shaped.
Figure 7:
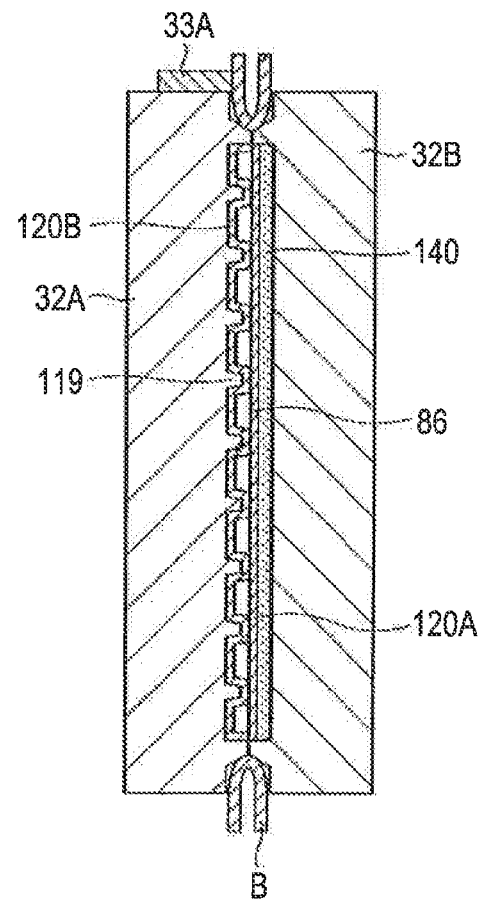
FIG. 7 is a view illustrating the molding apparatus according to the embodiment of the present invention in a state that the split mold blocks are clamped.
Figure 8:
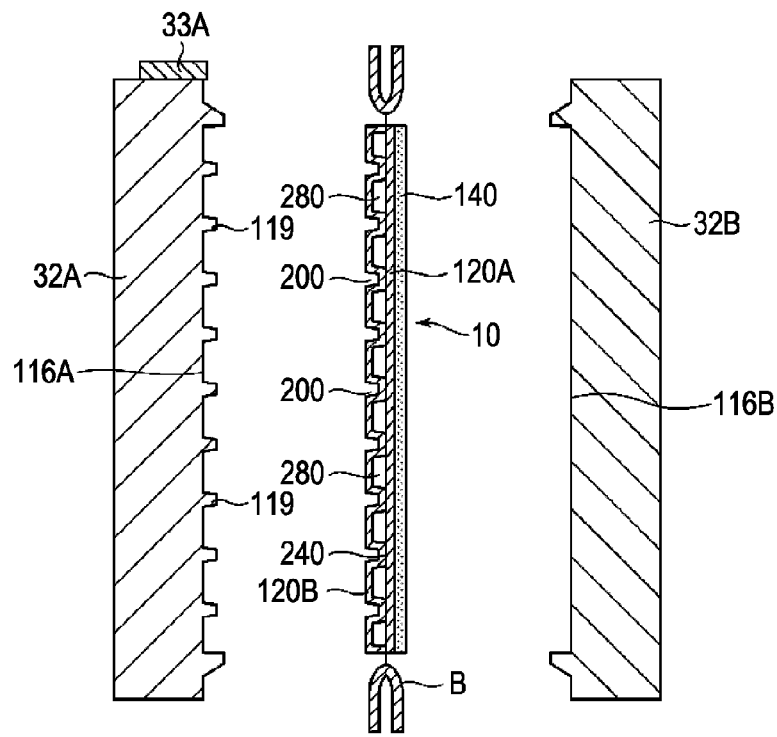
FIG. 8 is a view illustrating the molding apparatus according to the embodiment of the present invention in a state that the split mold blocks are separated.
Figure 9A:
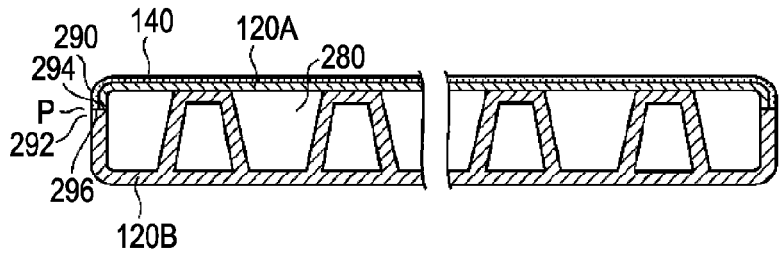
FIGS. 9A, 9B and 9C are partial sectional views each illustrating a peripheral end of a vehicle interior product according to the first embodiment of the present invention.
Figure 9B:
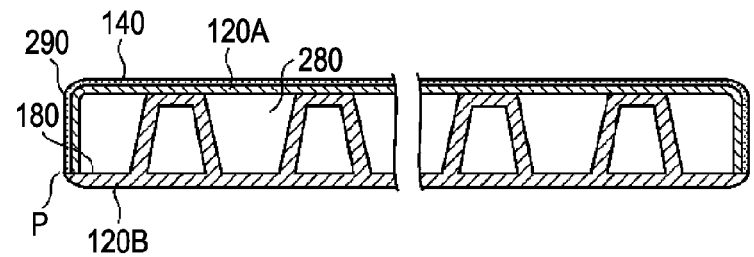
Figure 9C:
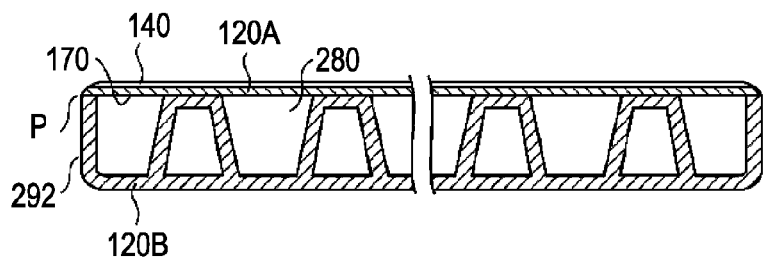
Figure 10:
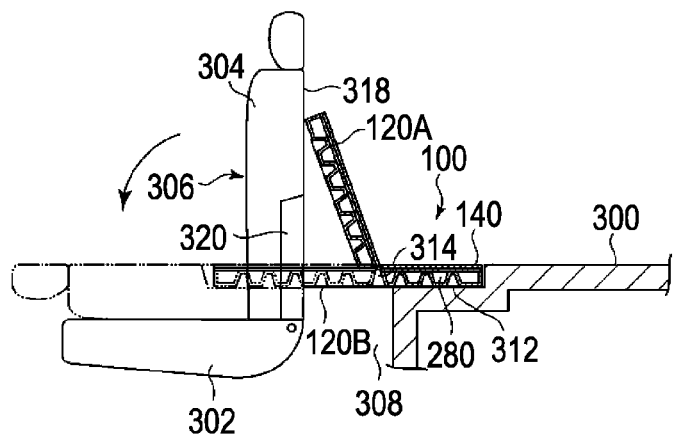
FIG. 10 is a schematic perspective view illustrating a state that the vehicle interior product according to the first embodiment of the present invention is attached.
Figure 11:
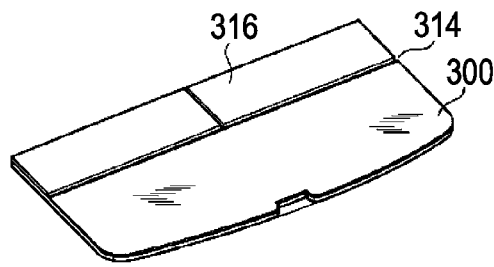
FIG. 11 is a general perspective view illustrating the vehicle interior product according to the first embodiment of the present invention.
Figure 12:
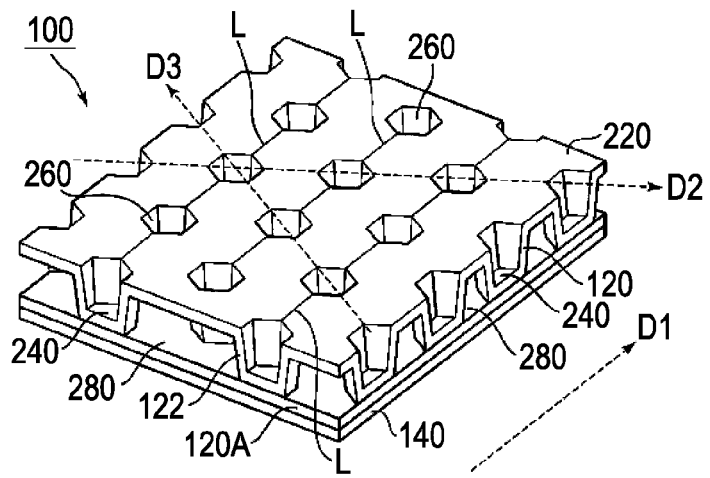
FIG. 12 is a view according to a second embodiment of the present invention, which is similar to FIG. 1.
Figure 13:
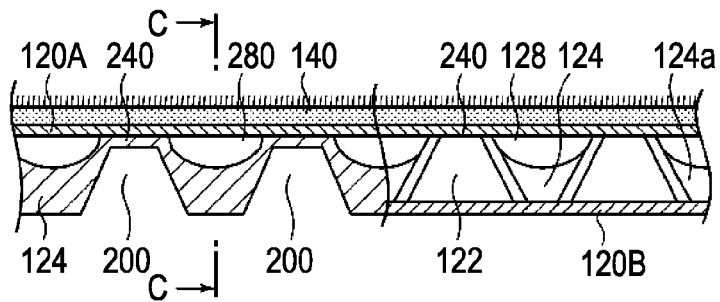
FIG. 13 is a view according to the second embodiment of the present invention, which is similar to FIG. 3.
Figure 14:
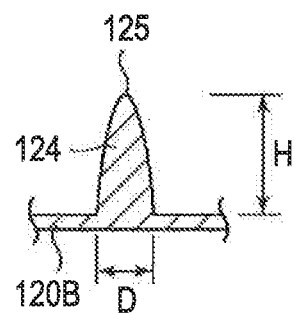
FIG. 14 is a sectional view taken along line C-C in FIG. 8, which illustrates a fold.
Figure 15:
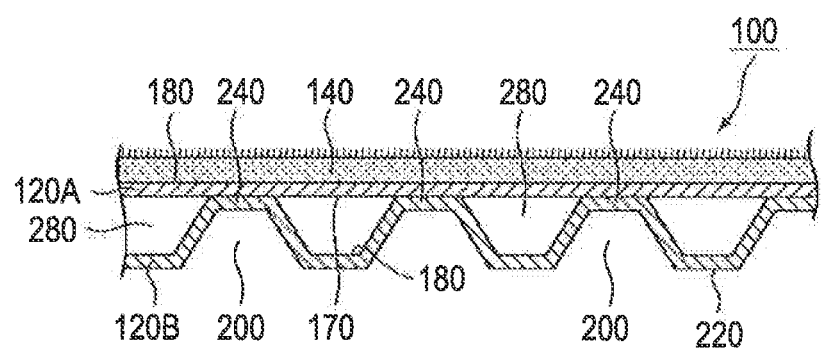
FIG. 15 is a view according to the second embodiment of the present invention, which is similar to FIG. 2.

The invention claimed is:

1. A resin laminate manufacturing method, comprising:
providing a pair of split mold blocks including a first mold block and a second mold block, the first mold block having a cavity with a plurality of protrusions extending toward the second mold block,
preparing first and second molten thermoplastic resin sheets each having a flat shape;
feeding the first and second molten thermoplastic resin sheets between the pair of split mold blocks with a predetermined gap left therebetween such that each thermoplastic resin sheet protrudes around annular pinch-off parts of the pair of the split mold blocks;
forming a hermetic space between the first thermoplastic resin sheet and the cavity of the first mold block opposed to an outer surface of the first thermoplastic resin sheet;
sucking air in the hermetic space from a side of the first mold block, pressing the outer surface of the first thermoplastic resin sheet against the cavity of the first mold block to shape the first thermoplastic resin sheet, and elongating the first thermoplastic resin sheet so as to fit the first thermoplastic resin sheet to the protrusions; and
clamping the pair of mold blocks, welding peripheral edges of the first and second molten thermoplastic resin sheets to each other, and welding top ends of the first thermoplastic resin sheet corresponding to tip ends of the protrusions to an inner surface of the second thermoplastic resin sheet, wherein,
either prior to or at said feeding of the first and second molten thermoplastic resin sheets between the pair of split mold blocks, the thickness of each of the first and second thermoplastic resin sheets is adjusted independently of the other to have the thickness of the first molten thermoplastic resin sheet thicker than the thickness of the second molten thermoplastic resin sheet.

2. The resin laminate manufacturing method according to claim 1, wherein

The second mold block has a cavity;

the first and second molten thermoplastic resin sheets are shaped in such a manner that, after clamping the pair of mold blocks, a blowing pressure is applied to the first and second thermoplastic resin sheets from the hermetic space formed between the clamped mold blocks to press the first and second molten thermoplastic resin sheets against the cavities of the corresponding first and second mold blocks, respectively.

3. The resin laminate manufacturing method according to claim 1, further comprising:

extruding two streaks of molten parisons, which have a flat shape and are to be the corresponding first and second molten thermoplastic resin sheets, toward a position between the pair of split mold blocks such that the parisons droop downward.

4. The resin laminate manufacturing method according to claim 1, wherein the protrusions are provided in plural rows on a surface of the cavity with a predetermined gap left therebetween in a first direction, and at least some of the protrusions on each row are arranged on the surface of the cavity in a strip to extend in a second direction perpendicular to the first direction.

5. The resin laminate manufacturing method according to claim 1, wherein the protrusions are arranged in a staggered pattern on the cavity.

6. The resin laminate manufacturing method according to claim 4, wherein each protrusion is tapered toward the second mold block to have a regular hexagonal prismoid shape.

7. The resin laminate manufacturing method according to claim 1, wherein the second thermoplastic resin sheet has an outer surface to which a decorative material is laminated.

8. The resin laminate manufacturing method according to claim 1, wherein the sucking of air in the hermetic space from the side of the first mold block includes shifting a frame outwardly fit to a peripheral edge of the first mold block in a slidable manner in a direction of clamping, toward the outer surface of the first thermoplastic resin sheet, and the hermetic space is formed by the outer surface of the first thermoplastic resin sheet, an inner circumferential surface of the frame, and the cavity of the first mold block.

9. The resin laminate manufacturing method according to claim 1, wherein the pinch-off parts are brought into contact with each other through the clamping of the pair of mold blocks, so that a parting line is formed by welding the peripheral edges of the first and second molten thermoplastic resin sheets to each other and a hermetic hollow portion is formed between the first and second molten thermoplastic resin sheets.

10. The resin laminate manufacturing method according to claim 5, wherein each protrusion is tapered toward the second mold block to have a regular hexagonal prismoid shape.

* * * * *

UNITED STATES PATENT AND TRADEMARK OFFICE
CERTIFICATE OF CORRECTION

PATENT NO. : 8,926,784 B2
APPLICATION NO. : 13/132024
DATED : January 6, 2015
INVENTOR(S) : Takehiko Sumi et al.

It is certified that error appears in the above-identified patent and that said Letters Patent is hereby corrected as shown below:

On the Title Page of the Patent, item (22):
PCT Filed: "Feb. 9, 2011" should read -- "Jan. 4, 2011" --

Signed and Sealed this
Eighth Day of March, 2016

Michelle K. Lee
*Director of the United States Patent and Trademark Office*